(12) United States Patent
Noel et al.

(10) Patent No.: US 12,135,549 B2
(45) Date of Patent: Nov. 5, 2024

(54) SYSTEMS AND METHODS FOR PROVIDING INFORMATION REGARDING PARTICULATE MATTER WITHIN AN AIRCRAFT ENGINE

(71) Applicant: General Electric Company, Schenectady, NY (US)

(72) Inventors: James R. Noel, Lynn, MA (US); Lauren M. Kelly, Lynn, MA (US); Jacques Paul, Lynn, MA (US)

(73) Assignee: General Electric Company, Evendale, OH (US)

( * ) Notice: Subject to any disclaimer, the term of this patent is extended or adjusted under 35 U.S.C. 154(b) by 330 days.

(21) Appl. No.: 17/669,331

(22) Filed: Feb. 10, 2022

(65) Prior Publication Data
US 2023/0251651 A1    Aug. 10, 2023

(51) Int. Cl.
| | |
|---|---|
| *G05D 1/00* | (2024.01) |
| *B64D 43/00* | (2006.01) |
| *F01D 21/14* | (2006.01) |
| *F02C 7/05* | (2006.01) |
| *G05D 1/80* | (2024.01) |

(52) U.S. Cl.
CPC ............ *G05D 1/0055* (2013.01); *B64D 43/00* (2013.01); *F01D 21/14* (2013.01); *G05D 1/80* (2024.01); *F02C 7/05* (2013.01); *F05D 2220/323* (2013.01); *F05D 2260/607* (2013.01); *F05D 2260/80* (2013.01); *F05D 2270/335* (2013.01); *F05D 2270/71* (2013.01)

(58) Field of Classification Search
CPC .......... B64D 43/00; F01D 21/14; G05D 1/80; F02C 7/05; F05D 2220/323; F05D 2260/607; F05D 2260/80; F05D 2270/335; F05D 2270/71
See application file for complete search history.

(56) References Cited

U.S. PATENT DOCUMENTS

| | | |
|---|---|---|
| 6,841,299 B2 | 1/2005 | Wariishi |
| 6,941,806 B2 | 9/2005 | Burns |
| 6,960,719 B2 | 11/2005 | Miksch |

(Continued)

FOREIGN PATENT DOCUMENTS

| | | |
|---|---|---|
| GB | 2529271 | 2/2016 |
| WO | 2011151462 | 12/2011 |

OTHER PUBLICATIONS

US 10,689,127 B2, 06/2020, Abe (withdrawn)
U.S. Appl. No. 17/669,335; Notice of Allowance and Fees Due (PTOL-85) mailed Dec. 6, 2023; (pp. 1-7).

*Primary Examiner* — Ryan D Walsh
(74) *Attorney, Agent, or Firm* — Fitch, Even, Tabin & Flannery, LLP

(57) ABSTRACT

Provided is a tangible computer-readable, non-transitory storage medium storing instructions that, when executed by a hardware processor of an aircraft, causes the hardware processor to execute a method. The method includes receiving, from an engine particulate sensor of the aircraft, a measure of particulate matter in a gas path of the engine during flight of the aircraft. The method also includes presenting to a pilot of the aircraft, a visualization of the particulate matter measure, wherein the visualization supports a navigation of the aircraft responsive to the presence of the particulate matter.

20 Claims, 12 Drawing Sheets

Exemplary Method for Engine Power Modeling

(56) References Cited

U.S. PATENT DOCUMENTS

| | | |
|---|---|---|
| 6,986,162 B2 | 1/2006 | Soto |
| 8,424,279 B2 | 4/2013 | Rajamani |
| 8,914,149 B2 | 12/2014 | Safa-Bakhsh |
| 9,714,967 B1 | 7/2017 | Weickert |
| 9,728,093 B2 | 8/2017 | Wiesemann |
| 9,909,971 B2 | 3/2018 | Knobloch |
| 10,024,187 B2 | 7/2018 | Soares, Jr. |
| 10,073,008 B2 | 9/2018 | Weickert |
| 10,672,282 B2 | 6/2020 | Garde |
| 10,725,382 B2 | 7/2020 | Zustiak |
| 10,752,382 B2 | 8/2020 | Kessie |
| 10,767,507 B2 | 9/2020 | Khibnik |
| 10,867,521 B2 | 12/2020 | Grimald |
| 10,977,880 B2 | 4/2021 | Calkins |
| 11,946,421 B2 | 4/2024 | Paul |
| 2004/0010850 A1 | 1/2004 | Nagaoka |
| 2007/0118270 A1 | 5/2007 | Wiseman |
| 2010/0287907 A1 | 11/2010 | Agrawal |
| 2013/0087708 A1* | 4/2013 | Tillotson ............... G01N 21/71 250/338.5 |
| 2016/0202168 A1* | 7/2016 | Knobloch ............. G01N 15/06 701/3 |
| 2017/0197728 A1* | 7/2017 | Rennó .................... G01T 1/178 |
| 2017/0217606 A1* | 8/2017 | Fisher ..................... F02C 9/00 |
| 2017/0361947 A1* | 12/2017 | Kessie .................. G07C 5/008 |
| 2018/0068498 A1* | 3/2018 | Hodge .................. G01M 15/14 |
| 2018/0081364 A1 | 3/2018 | Northcutt |
| 2018/0099760 A1 | 4/2018 | Paul |
| 2018/0194487 A1* | 7/2018 | Flynn .................. G06V 10/147 |
| 2019/0017409 A1* | 1/2019 | Yardibi .................... F02C 9/00 |
| 2019/0093568 A1 | 3/2019 | Escriche |
| 2019/0112072 A1 | 4/2019 | Abe |
| 2019/0146000 A1 | 5/2019 | Hurst |
| 2019/0164438 A1 | 5/2019 | Grimald |
| 2022/0097864 A1* | 3/2022 | Baladi ..................... F02C 9/00 |
| 2023/0250762 A1* | 8/2023 | Paul ........................ F02C 7/05 701/100 |
| 2023/0251651 A1 | 8/2023 | Noel |

* cited by examiner

Exemplary Engine Monitor/Controller

SYSTEMS AND METHODS FOR PROVIDING INFORMATION REGARDING PARTICULATE MATTER WITHIN AN AIRCRAFT ENGINE

TECHNICAL FIELD

The embodiments relate to the field of aviation engine performance assessment, and more particularly, to systems and methods for monitoring particulate matter within an aircraft engine.

BACKGROUND

An aircraft turbine engine generally includes a core having, in serial flow order, a compressor section, a combustion section, a turbine section, and an exhaust section. One or more shafts may be provided to drivingly connect the turbine section to the compressor section, and optionally, to drivingly connect the turbine section to a load. When such an aircraft engine is incorporated into a rotary aircraft, such as a helicopter, the one or more shafts of the aircraft engine may be mechanically coupled to a main rotor of the rotary aircraft. This arrangement allows the main rotor to provide lift for the rotary aircraft.

By way of background, an aircraft engine draws air from the environment through an inlet, the air then generally running through the length of the engine to the exhaust. The inlet air, that can include oxygen, nitrogen, and other gaseous elements, may also include particulate matter (PAM). For example, a low-flying helicopter may kick up PAM (i.e., dirt, sand, and other debris from the ground), some of which may then be absorbed into the engine itself. It is also possible that, in some environments, substantial quantities of dust or debris may be present in the air from other environmental sources (e.g., smog-filled urban environments, explosions in a battle environment).

For an aircraft such as a helicopter operating at low altitudes, possibly in sand, dust, or debris-intensive environments, even a short-term intake of a high volume of dust, sand, or other PAM may reduce aircraft engine efficiency, which in turn may imperil aircraft operability and prevent or limit mission completion.

BRIEF DESCRIPTION OF THE DRAWINGS

Advantageous designs of embodiments result from independent and dependent claims, the description, and the drawings. In the following, various examples of embodiments of the present disclosure are explained in detail with the aid of the attached drawings:

DETAILED DESCRIPTION

Figure 1:
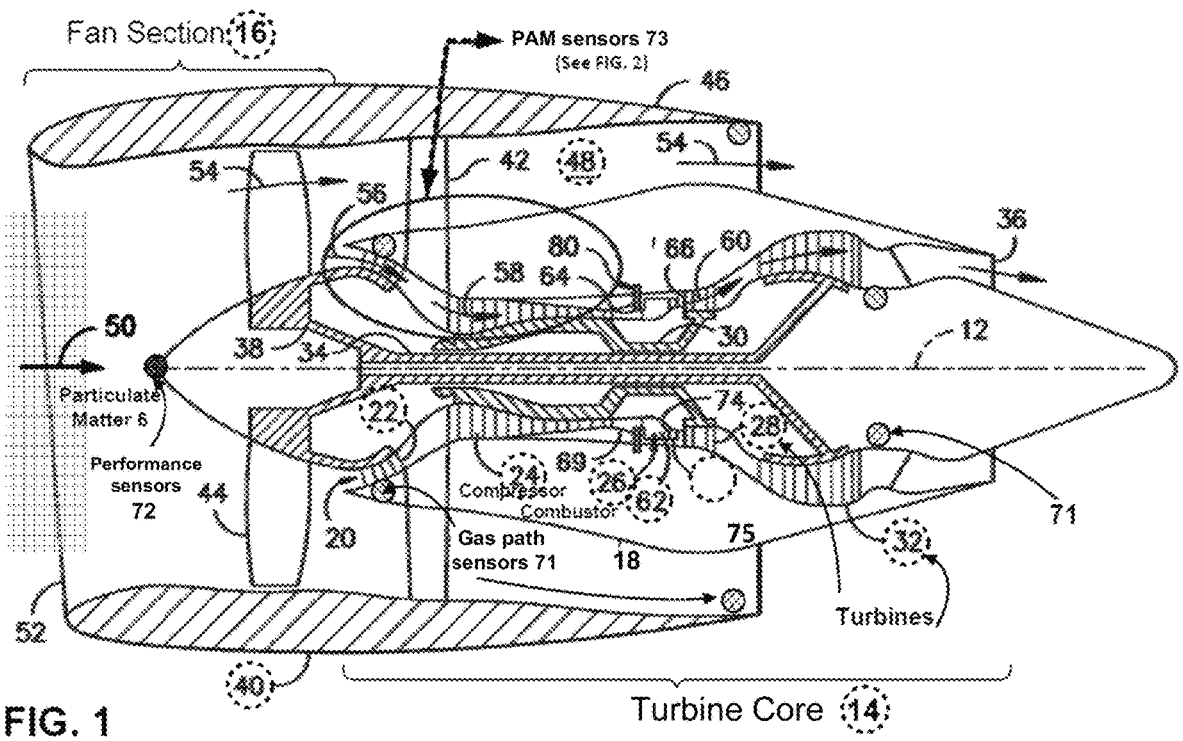
FIG. 1 illustrates an exemplary aircraft engine according to the present system and method.

The following detailed description is merely exemplary in nature and is not intended to limit the disclosure, nor the elements or disclosure, nor its applications. Further, there is no intention for the scope to be bound or limited to or by any theory presented in the preceding background or summary, nor in the following detailed description.

As used herein, the term PAM generally refers to small particles of matter that are substantially suspended in the air, or briefly present in the air due to sudden air motions and may be taken into the engine. For example, PAM can include dust, debris, sand, aerosol particles etc., and may include sizes from 0.1 micrometers ($\mu$ms) to 2 millimeters (mms).

PAM is generally sufficiently large to jeopardize engine operation over time, but small enough to avoid immediately impacting engine operations or damage engine components. Larger particles of matter, however, such as granules, gravel, etc. present a greater risk of immediate damage to engine operations. These larger particles of matter can have an especially strong negative affect, for example, on compressor performance—rendering the compressors unable to compress air (i.e., reducing compressor flow scalar).

Smaller particles may have a stronger impact on high-pressure turbines because the smaller particles may melt and bond with the high-pressure turbine. High-pressure turbines may employ air cooling to keep the blade from melting, but air flow cooling passages can get plugged by particular matter. This reduces turbine cooling air scalar, or secondary flow quantity. Particles of various sizes may also result in generally higher engine temperatures downstream, reducing an engine's efficiency scalar.

Degradation is also a significant consideration. For example, it is prudent to ensure aircraft engines are operating properly before and/or during flight, and to maintain such aircraft engines before the engine degrades past a threshold. One measure of degradation is engine torque factor (ETF): a non-dimensional ratio of a current maximum corrected torque compared to a maximum corrected torque available to a nominal engine.

When the ETF degrades below a threshold, the engine may be sidelined for maintenance. Engine degradation can be caused by an intake of dust, or other PAM, and could be sufficient to reduce the maximum available vertical lift.

One way to determine ETF is by utilizing a baseline engine power model providing a correlation of a corrected engine temperature to corrected engine torque. A specific conventional technique for determining an ETF specific to a particular aircraft engine. The technique further includes determining ETF capable of considering certain operating conditions (e.g., internal gas pressures) and/or ambient conditions of the aircraft engine.

One shortcoming of the traditional approach discussed above is the effect on engine performance of PAM ingestion. At higher altitudes, the intake of PAM may be minimal. However, for engines operating for sustained periods of time at low altitudes, such as military aircraft, an accumulation of PAM from the air can substantially reduce engine power. Embodiments of the present disclosure address the above shortcomings in the conventional technique.

The embodiments were derived from an observation that by slightly repositioning an aircraft, flying in a sand-dense environment, can substantially reduce the amount of sand particles ingested by the engine. For example, by changing the position of the aircraft by a few feet, or angling it by a few degrees during flight, can reduce the amount of sand ingested by its engines by a factor of two or more. The real-time availability of this information can help the pilot determine whether a current mission (or a set of missions) can be successfully completed or whether the mission should be aborted.

FIG. 1 is a schematic cross-sectional view of one embodiment of a gas turbine engine 100 according to the embodiments and may be used as an aircraft engine. The gas turbine engine 100 has an axial longitudinal centerline axis 12 therethrough for reference purposes. The engine 100 includes a turbine core 14 and a fan section 16 positioned upstream thereof. The turbine core 14 typically includes a generally tubular outer casing 18 defining an annular inlet 20. The outer casing 18 further encloses and supports a booster 22 for raising the pressure of air entering the turbine core 14 to a first pressure level.

A high-pressure compressor 24 (e.g., a high-pressure, multi-stage, axial-flow compressor) receives pressurized air from the booster 22 and further increases the pressure of the air. The high-pressure compressor 24 includes rotating blades and stationary vanes directing compressed air within the engine 100. The pressurized air flows to a combustor 26, where fuel is injected into the pressurized air stream and ignited to raise the temperature and energy level of the pressurized air.

The high energy combustion products flow from the combustor 26 to a first (high-pressure) turbine 28 for driving the high-pressure compressor 24 through a first (high-pressure) drive shaft 30. The high energy combustion products then flow to a second (low-pressure) turbine 32 for driving the booster 22 and the fan section 16 through a second (low-pressure) drive shaft 34 that is coaxial with the first drive shaft 30. After driving each of the respective first and second turbines 28 and 32, the combustion products leave the turbine core 14 through exhaust nozzle 36 to provide at least a portion of the jet propulsive thrust of the engine 100.

The fan section 16 includes a fan rotor 38 (e.g., a rotatable, axial-flow fan rotor) that is surrounded by an annular fan casing 46. The annular fan casing 46 is supported from the turbine core 14 by a plurality of substantially radially extending outlet guide vanes 42. In this way, the fan casing 40 encloses the fan rotor 38 and the fan rotor blades 44. A downstream section of the annular fan casing 46 extends over an outer portion of the turbine core 14 defining a secondary, or bypass, airflow conduit 48 providing additional jet propulsive thrust.

An initial airflow 50 enters the gas turbine engine 100 through an inlet 52 to the fan casing 40. The initial airflow 50 may include PAM 6. The initial airflow 50 passes through the fan rotor blades 44 and forms a second air flow 54 that moves through the airflow conduit 48 and a second compressed airflow 56 entering the booster 22.

The pressure of the second compressed airflow 56 is increased and enters the high-pressure compressor 24 (arrow 58). After mixing with fuel and being combusted in the combustor 26, the combustion products 60 exit the combustor 26 and flow through the first turbine 28. The combustion products 60 then flow through the second turbine 32 and exit the exhaust nozzle 36 providing a portion of the thrust for the engine 100.

The combustor 26 includes an annular combustion chamber 62 coaxial with the axial longitudinal centerline axis 12, as well as an inlet 64 and an outlet 66. The combustor 26 receives an annular stream of pressurized air from a high-pressure compressor discharge outlet 69. A portion of this compressor discharge air flows into a mixer (not shown). Fuel is injected from a fuel nozzle 80 to mix with the air and form a fuel-air mixture that is provided to the annular combustion chamber 62 for combustion. Ignition of the fuel-air mixture is accomplished by a suitable igniter, and the resulting combustion products 60 flow in an axial direction toward and into an annular, first stage turbine nozzle.

The nozzle is defined by an annular flow channel that includes a plurality of radially extending, circumferentially spaced nozzle vanes 74 that turn the gases so that they flow angularly and impinge upon the first stage turbine blades of the first turbine 28. The first turbine 28 rotates the high-pressure compressor 24 via the first drive shaft 30. The second turbine 32 drives the booster 22 and the fan rotor 38 via the second drive shaft 34.

The annular combustion chamber 62 is housed within the outer casing 18 and fuel is supplied into the annular combustion chamber 62 by one or more fuel nozzles 80. Liquid fuel is transported through one or more passageways or conduits within a stem of the fuel nozzle 80.

The gas path is the entire fore to after path of the initial airflow 50 (and PAM 6) through the engine 100 and may include multiple channels broadly parallel and coaxial with the centerline axis 12. Thus the gas path may include the initial airflow 50, the inlet 52, conduit 48 and booster 22, high-pressure compressor 24, discharge outlet 69, combustor 26, annular combustion chamber 62, first stage turbine nozzle 75, first turbine 28, second turbine 32, and the engine exhaust nozzle 36.

During operation, PAM 6 is ingested by the gas turbine engine 100, typically suspended in or mixed in with the initial airflow 50 entering the inlet 52. PAM accumulation is a key input for engine analytics. The level and impact of these accumulations is important in evaluating engine service time, wear, and tear, and/or other maintenance schedules.

As PAM 6 is generally harmful to engine operation, one objective of the embodiments is to aid an aircraft operator (or a drone navigation system) in navigating to minimize the intake of PAM 6 by the engine 100. Thus, the embodiments include environmental PAM sensors 73 (e.g., electrostatic sensors) and techniques for detecting PAM 6 in the engine 100.

Figure 2:
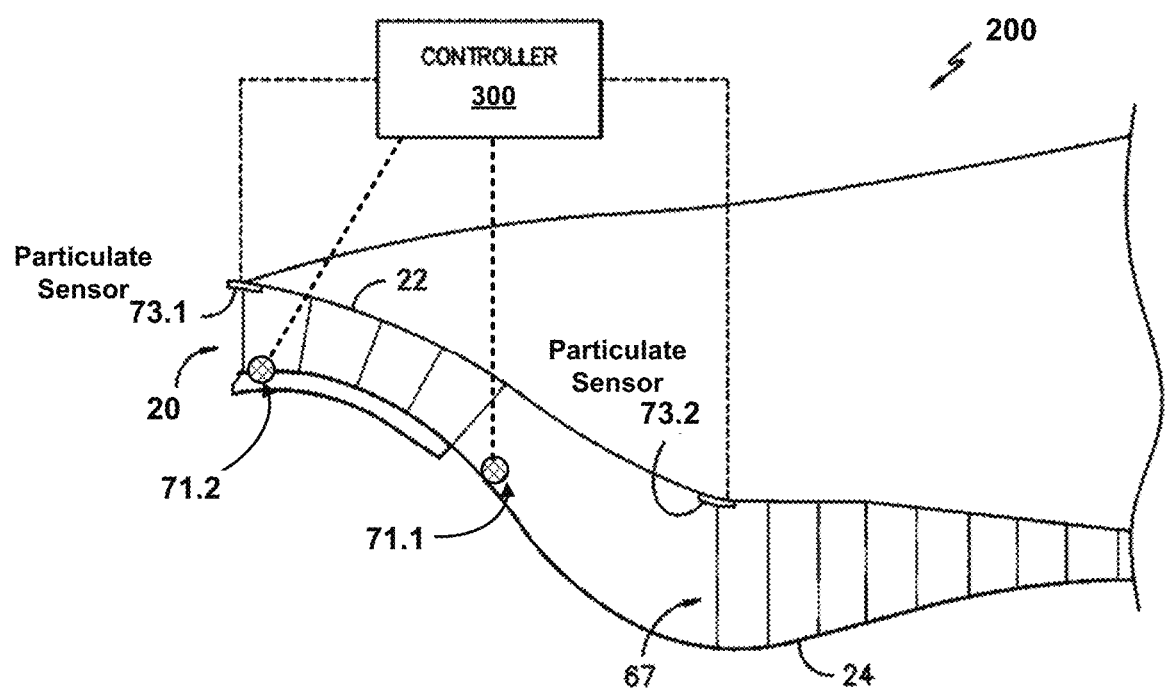
FIG. 2 illustrates exemplary placements of exemplary particulate sensors in an exemplary module of an exemplary aircraft engine.
Figure 3:
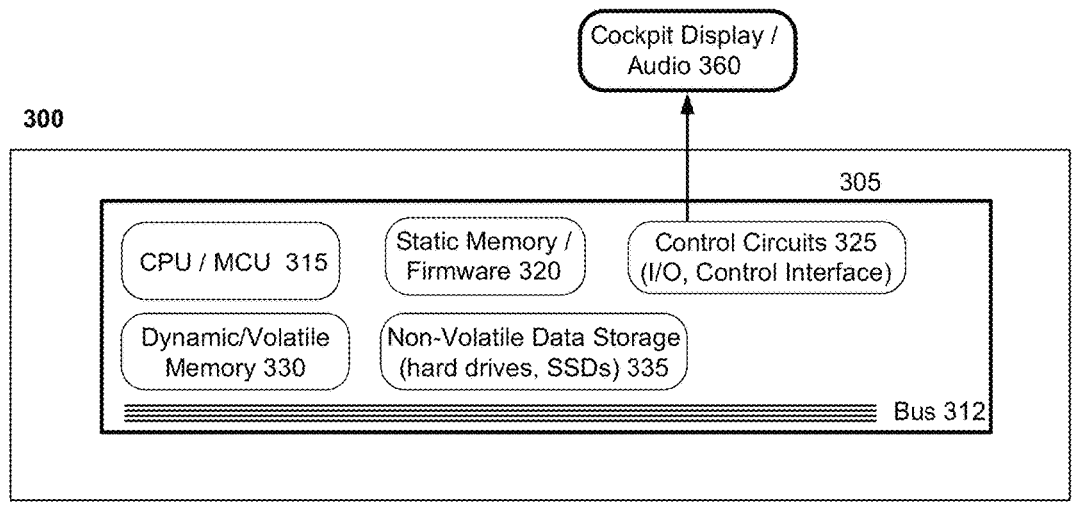
FIG. 3 illustrates an exemplary controller which may be deployed in an aircraft engine according to the embodiments.

In FIG. 2, an exemplary engine sensor system 200 may include one or more gas-path sensors 71 (e.g., air pressure sensors 71.1, temperature sensors 71.2) and engine performance sensors 72 (e.g., rotation speed sensors) for turbine blades of shafts. Multiple engine environmental sensors, such as gas-path and performance sensors 71 and 72 respectively, may be mounted at suitable points within the engine 100, communicatively coupled with a processing system or controller 300 (FIG. 3). The positioning of the gas path sensors 71, the performance sensors 72, and the PAM sensors 73 is exemplary and for purposes of illustration only, as these sensors may be placed at other suitable positions within the engine 100.

For purposes of measuring PAM 6 in the initial airflow 50, PAM sensors 73 (73.1, 73.2, . . . 73.$n$) may be electrostatic and employed, communicatively coupled to the controller 300. Multiple PAM sensors 73 may be mounted at suitable points within the engine 100, with FIG. 2 illustrating two of the PAM sensors 73 positioned at the fore sections of the booster 22 and high-pressure compressor 24.

The exemplary PAM sensors 73 are electrostatic sensors. That is, the PAM sensors 73 detect the presence of electrical charge attached to PAM particles. The amount of charge can be measured and correlated to an amount or density of PAM particles.

Each PAM sensors 73 is configured for mounting to the engine 100 in an area prone to PAM 6 being in the initial airflow 50. A sensing face of one or more of the PAM sensors 73 is exposed to the initial airflow 50 and configured to detect the PAM 6. The PAM sensors 73 may also include an internal electrode and amplifier configured within a sensing portion. PAM 6, in the form of charged dust particles, may flow past the sensing face of the one or more of the PAM sensors 73. The charged dust particles induce motion of electrons therein and facilitate detection by the amplifier to indicate a level of the charge associated with the PAM 6 flowing past the sensing face.

Although the exemplary PAM sensors 73 are electrostatic sensors, other types of sensors can be used and would be within the spirit and scope of the present disclosure. For example, other types of sensors could include optical and acoustic sensors. Optical and acoustic sensors, using techniques known to those of skill in the art, may respectively detect levels of opacity and acoustic signatures of sand or PAM particles in correlation with sand or PAM densities. Optical sensors may also identify discolorations of metal surfaces and/or changes in reflectivity of interior engine surfaces. The discolorations are indicative of PAM 6 melted onto, or otherwise adhered to, components within the engine 100.

Other forms of PAM or particulate sensors may be used that deliver a signal indicative of one or more of a density, a flow rate, a mass, a speed, and/or a volume of PAM 6 detected in the engine 100. Alternative sensors may be used to identify static accumulations of the PAM 6 on components within the engine 100. By way of example, the PAM sensors 73 may also be spectrographic to detect specific types (i.e., atomic or molecular compositions) of PAM 6.

In other examples, the PAM sensors 73 may detect PAM 6, in the form of airborne aerosol particles, ice crystals, pollutants, and/or volcanic ash within the engine flow path. The PAM sensors 73 may be configured to alert an engine controller 300 (see FIG. 3 below) in the event of such detection. The PAM sensors 73 may also provide a continuous stream of real-time data 403 (see FIG. 4 below) is PAM 6 is not detected. Further, the sensor 73 may be configured to detect internally generated PAM and alert the controller 300.

Figure 4:
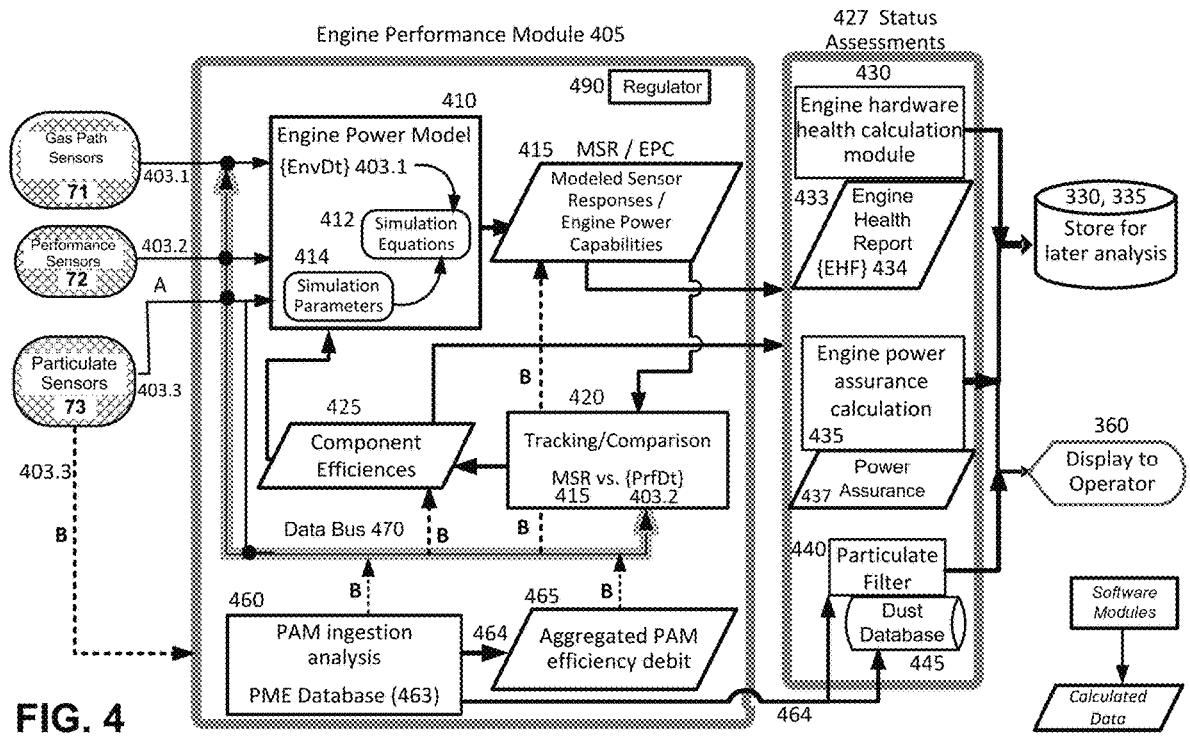
FIG. 4 illustrates elements of an exemplary engine power, health, and maintenance system according to the embodiments.

For example, referring to FIG. 4, received real-time data 403 may be categorized for purposes of calculation. A first subset of the sensor data may be referred to environmental data {EnvDt} 403.1. This first subset will typically reflect an interior environment of the engine 100 and gas path (such as temperatures) but may also include data pertaining to performance of specific engine parts, such as a current bleed air factor. EnvDt 403.1 may also include overall aircraft environment, such as exterior temperature, aircraft velocity, aircraft altitude, icing conditions, exterior wind speeds, and similar data.

A second subset of the sensor data may be referred to as performance data {PrfDt}403.2. PrfDt 403.2 is typically indicative of the measured raw performance of various engine components or modules.

Categories of sensor data may vary in different embodiments. For example, gas flow velocities or pressures may be viewed as real-time gas path sensor data 403.1 in some embodiments, or as real-time performance data 403.2 in other embodiments. EnvDt 403.1 may be used as input data for an engine power model, while PrfDt 403.2 may be used for comparison with expected or modeled engine performance.

FIG. 3 is a system level diagram of an exemplary engine controller 300, such as a digital computer. The engine controller 300 may execute computer code enabling the aircraft to sense the PAM 6, implement engine performance checks, navigation guide techniques, and maintenance assessments. For example, the engine controller 300 may be a dedicated controller implementing digital control and operations of the engine 100.

Alternatively, the controller 300 may be a remote computer, such as a ground-based computer, or satellite-based computer, receiving engine data from the engine 100. In other embodiments, techniques disclosed herein may be implemented via off-board analytic (ground station or remote monitoring) software.

The controller 300 includes a printed circuit board (PCB) 305, or motherboard, interconnected to other controller components. The PCB 305 includes a central processing unit (CPU) 315. The CPU 315 may include signal processing capabilities to support fine-grained time/spatial assessments of PAM distributions.

As an example, such assessments may include fine-grained distributions of the PAM 6 within the interior of the engine or detailed time/spatial mappings of PAM types, densities, or distributions encountered in environments traversed by the aircraft with engine 100.

Such mappings may be useful in identifying or predicting future patterns of PAM distributions, whether interior to or exterior to the engines and in correlating PAM distributions with various internal parts or structures of the engine 100, or with exterior terrains, locations, etc. In one nonlimiting example, such signal processing may enable correlation between a percentage of PAM 6 as a function of aircraft speeds, wind speeds, engine torque, engine temperatures, or other factors. Such analysis may aid in the anticipation of future maintenance needs and ultimately, improve engine design.

The controller 300 also includes static memory/firmware 320, control circuits 325, a dynamic memory 330, and/or non-volatile data storage 335. The control circuits 325 may perform a variety of tasks, including data and control exchanges, as well as input/output (I/O) tasks, access to system data bus 312, network connection operations etc. The control circuits 325 may also control or interface with non-volatile data storage 335, and interface with the PAM sensors 73, gas path sensors 71, and the performance sensors 72.

The system data bus 312 provides for data communications among the CPU 315, the static memory 320, the dynamic memory 330, and non-volatile data storage 335. A display 360 (e.g., cockpit informational system), which may be visual display screen and/or audio, may be communicatively coupled with the controller 300 to present flight data to an aircraft operator. The flight data displayed on the display 360 may include indications of engine power performance and/or indications of maintenance requirements for the aircraft engines. Voice, mechanical, or tactile input means may also be communicatively coupled with the controller 300 to enable operator control thereof.

During flight, as the engine 100 receives the initial airflow 50, embedded PAM 6 may significantly reduce engine efficiency such that the aircraft may not be capable of sustaining lift or flight. Further, whether the PAM 6 is large or small, sufficient densities of the PAM 6 may be enough to place flight operations at risk. The longer the periods of time when, for example, PAM laden air is ingested by the engine 100, the greater the risk to flight operations. Accumulations of the PAM 6 over extended times (e.g., hours, days, weeks) can reduce engine performance over extended times and necessitate frequent maintenance.

Techniques employed to determine the impact of PAM 6 on engine performance may consider particle size distributions or densities. The PAM sensors 73 senses the engine inlet 52 and uses that information in conjunction with engine health and module health techniques (e.g., engine performance module 405 and status assessments module 27) to identify which gas-path modules may require maintenance or repair immediately or in the near future.

FIG. 4 illustrates elements of an exemplary combined software-processing-module diagram and data flow for an engine power, health, and maintenance system (EPHMS) 400. The EPHMS 400 assesses the engine hardware health calculations module 430 and provides for engine power assurance calculations (e.g., via an engine power assurance calculation module 435) of a specific aircraft gas turbine engine 100. A data bus 470 (implemented as hardware or virtually in software), may transmit data between the sensors 71, 72, 73, various modules 410, 425, and outputs of engine performance module 405. A sensor regulator 490 calibrates operation of sensors 71, 72, and 73.

In the exemplary EPHMS 400, an engine performance module 405 receives during aircraft flight, real-time data 403 from the sensors 71, 72, and 73. The engine performance module 405 can be implemented in part as an engine power model 410. In various embodiments, the engine power model 410 may be based on a mathematical model with suitable simulation techniques 412 (and/or simulation lookup tables), with simulation parameters 414 to model expected engine behavior.

The engine power model 410 generates, in real-time, a set of modeled sensor responses (MSRs) 415, based on the real-time data 403. The MSRs 415 are also known as the engine power capabilities. The real-time data 403 and outputs from the engine performance module 405 are examples only. The real-time data 403 received as inputs above, for example, could represent various other engine parameters.

The real-time data 403 is obtained in real-time from some or all of the sensors 71, 72, and 73. The engine power model 410 simulates the expected engine performance based on the simulation techniques 412 and modeling simulation parameters 414. The simulation techniques 412 will typically be parameterized with suitable engine performance/operational parameters known in the art.

Engine performance/operational parameters may include parameters indicative of specific physical properties of components of the engine 100, such as engine part diameters, lengths, volumes, part masses, etc. Additional exemplary parameters include compression capabilities, thrusts, and efficiency factors for engine components.

Persons skilled in the relevant arts will recognize that if the simulation parameters 414 are altered (e.g., modified during flight) this would alter the MSRs 415. The engine power model 410 yields as output one or more data streams for the MSRs 415.

The engine performance module 405 is implemented in part as an engine power model 410 and based upon physics and engineering techniques, along with one or more parameterized models of aircraft engine components and their interactions. The engine performance module 405 is configured to model aircraft engine performance and engine power generation.

The engine performance module 405 may also be implemented in physics-and-engine-component-based simulation models with other forms of simulation tools. For example, the engine power model 410 may be implemented via suitable neural network models 680 (see FIG. 6D), statistical regression models 685 (FIG. 6D) or via other forms of predictive modeling.

The neural network models 680 may be trained according to known methods to simulate aircraft engine performance under various conditions without particulate factors. The neural network models 680 may be further enhanced to recognize additional degradations as a function of various intake levels of the PAM 6. The neural network models 680 may then provide real-time predictions of engine performance degradations and predict decreases in flight times without specific modeling of engine components.

The neural network models 680 or the statistical regression models 685 of engine performance, in view of the PAM 6 intake may be developed based on historical field data of aircraft performance. These models may also be employed by engine performance module 405, the engine power model 410, and a tracking/comparison module 420 to anticipate degradation in engine performance.

The engine power model 410 may output the MSRs 415. The MSRs 415 represents a summary view of the power the engine 100 can deliver. The MSRs 415 may be formulated in different ways. In general, the gas path sensor data 403.1 and the performance sensor data 403.2 may provide exemplary real-time data states as thrust generated by the engine 100, such as fuel consumption, torque factor, and engine pressure for various points along the engine. Current engine power capability may be assessed by simulating any one of operational/environmental states (above) as a function of the other of states. For example, engine power capability may be determined as an amount of thrust generated by the engine 100 for a given engine fuel consumption.

The engine performance module 405 includes a tracking/comparison module 420. The tracking/comparison module 420 tracks the real-time data 403 from the sensors 71, 72, and 73 and the MSRs 415. Where the MSRs 415 differ from the real-time data 403, and in particular, from real-time performance sensor data 403.2, indicates that some components of the gas turbine engine 100 are not performing at expected efficiency. Responsive to such a determination, the tracking/comparison module 420 determines and outputs component efficiencies 425 for appropriate engine components.

The component efficiencies 425 may be determined as efficiency adjustments for specific engine hardware components of the engine 100. For example, an engine compressor may be currently operating at only 94% of an expected efficiency, or at 96% of an expected efficiency.

The component efficiencies 425 may be identified via adjustments to various simulation parameters 414. Any parameters to be adjusted will be specific to the particular simulation technique engine power employed by the engine power model 410. For example, the engine power model 410 may include one or more techniques (e.g., linear or straight-line mathematical expressions) indicative of expected engine turbine speed as a function of engine temperature. An adjustment to engine component efficiencies 425 may be reflected in the lowering of such a turbine-speed/engine line, indicating that at any given engine temperature a turbine blade is rotating at a lower-than-expected angular speed.

The engine performance module 405 continually adjusts the simulation parameters 414 of the engine power model 410 so the MSRs 415 converge on the real-time sensor performance data 403.2. In this way, the MSRs 415 substantially reflecting the current component efficiencies of the engine 100, consider declines in engine power and performance over time. Based on a continually updated and accurate engine power model 410, the engine performance module 405 can accurately predict engine health and engine performance for the near future.

In FIG. 4, an engine status assessments module 427 receives output data from the engine performance module 405, including from the MSRs 415 and the determined component efficiencies 425. The engine status assessments module 427 outputs engine health factors (EHF) 434 indicative of overall health of the engine 100. By way of example, the EHF 434 may include engine health metrics such as engine torque factor, engine temperature, engine thrust, an engine pressure etc.

An engine hardware health calculation module 430 generates an engine health report 433. The engine health report 433 provides measures of the health of one or more engine components, or health of the engine 100 as a whole. The engine health report 433 may indicate component efficiencies 425 for the various engine health metrics, including a rate of decline of engine power over time etc. Other indicators of engine health may be determined as well. The engine health report 433 may include summary values for engine health which are determined based on various combinations of the EHF 434.

An aggregate engine health value may be determined based on multiple factors, such as a weighted average of efficiencies of different engine components, and engine power capabilities. The aggregate engine health value may also be based on past or projected rate of decline of the engine's power capability to determine a projected date when engine maintenance will be required based on a rate of engine power decline.

An engine power assurance calculation module 435 generates an engine power assurance report 437 as a function of PAM ingestion and corresponding reductions in engine power if PAM ingestion continues. The assurance report indicating whether the engine 100 can maintain sufficient power for flight under various aircraft stress conditions created by the PAM ingestion.

The EPHMS 400 may be configured to output data from the engine status assessments module 427 and present this data to the aircraft operator via the display 360. The data may also be stored in the dynamic memory 330 and/or the data storage 335. In this way, all engine health assessments (e.g., the engine health report 433, the engine power assurance report 437) of the EPHMS 400 may enable the aircraft operator to modify current aircraft operations and enable aircraft maintenance personnel to anticipate future maintenance requirements.

PAM data may be mathematically filtered and summarized, as one example, by averaging the amount of PAM 6 entering the engine 100 over short time periods. This data may help the aircraft operator maneuver the aircraft to reduce the current intake of the PAM 6. Mathematical processing may be performed by a particulate ingestion analysis module 460 of the engine performance module 405.

In alternative embodiments, the mathematical processing may be performed by a particulate filter module 440 or the engine status assessments module 427. A local PAM database 445 may support the short-term retention of PAM intake (volumes, densities, composition) to support real-time PAM data analysis. Modifying a flight path of the aircraft may be facilitated by presenting the aircraft operator a visual display of the intake of PAM 6 via the display 360.

PAM 6 ingested by the gas turbine engine 100 during flight may reduce engine efficiency and operation, while also increasing the frequency of required engine maintenance. Consequently, the EPHMS 400 may include provisions for measuring the PAM 6 and assessing the effect on the engine's maintenance and efficiency.

The PAM sensors 73 can detect a variety of types of real-time PAM sensor data 403.3 pertaining to PAM intake and flow by the engine 100. The real-time PAM sensor data 403.3 may include particulate density (or density distribution), masses, and accumulation on components of the engine 100.

The PAM sensors 73 may be configured to detect particulate sizes and/or particulate composition. Data detected by the PAM sensors 73 may be encoded into raw form, compressed form, and/or summary form to produce the real-time PAM sensor data 403.3 that may be a continuous data stream during flight.

Following a path (A) for PAM sensor data 403.3, raw particulate data may be received directly by the engine power model 410. The simulation techniques 412 determines reductions in compressor efficiencies as a function of particulate density, particulate size, particulate mass, or particulate composition (PDSMC) and possibly other PAM sensor data 403.3 from PAM sensors 73. The simulation techniques 412 also determine, as a function of PDSMC, (i) increased loads on turbine blades, (ii) decreases in combustion chamber burn efficiency, (iii) decreases in gas flow rate, and (iv) other effects on performance of the engine 100.

The engine performance module 405 may employ the tracking/comparison module 420 to compare the MSRs 415 and the real-time sensor performance data 403.2. Based on the comparisons, various engine component efficiencies 425 may be used to modify the simulation parameters 414.

Employing an alternative data path (B) for the real-time PAM sensor data 403.3, the engine power model 410 processes the real-time data 403.1, 403.2 from the gas path sensors 71 and performance sensors 72, respectively. Real-time PAM sensor data 403.3 may be received by a particulate ingestion analysis module 460. The particulate ingestion analysis module 460 can maintain a running log of the sensed PAM flow that may include particulate density, particulate volume, mass, composition, and other data. Based on the real-time PAM sensor data 403.3, the particulate ingestion analysis module 460 determines an aggregate efficiency particulate debit 465 for the engine 100 as a whole, or respective aggregated particulate efficiency debits 465.n for components therein.

For example, the particulate efficiency debit 465 may be represented in percentage terms, indicating that a selected engine component (e.g., a compressor) will operate at only 93% efficiency, due to PAM 6, as compared with the compressor's performance without intake of the PAM 6. The aggregate efficiency particulate debit 465 may then modify the MSRs 415 and the component efficiencies 425.

The engine performance module 405 continually adjusts the simulation parameters 414 of the engine power model 410, so that an output therefrom converges on the real-time performance sensor data 403.2. Thus, the embodiments provide real-time simulation data substantially reflecting current component efficiencies 425 based upon intake of the PAM 6.

Based on the engine power model 410, the engine performance module 405 may identify a maximum power (lift, thrust) the engine 100 can provide under hypothetical, non-current mission conditions. For example, based on the engine power model 410, the engine performance module 405 may identify a maximum power, lift, thrust which the engine 100 can provide under worst-case mission conditions (e.g., maximum desired aircraft load, maximum or minimum exterior temperatures, maximum exterior winds, etc.).

By including real-time PAM sensor data 403.3 as a component in the simulation techniques 412 and in the simulation parameters 414, the engine power model 410 provides a more reliable simulation of engine performance. As a result, measuring the PAM 6 facilitates more reliable extrapolations of engine power to various potential or hypothetical adverse environments.

The engine power assurance calculation module 435 may generate the engine power assurance report 437, as a function of recent PAM ingestion and corresponding reductions in engine power if PAM ingestion continues over time. In the short-term (i.e., minutes, hours), the engine power assurance report 437 may indicate if the engine 100 can maintain sufficient power for flight under various aircraft stress conditions.

The EPHMS 400 may receive output data from the engine status assessments module 427, and present to the aircraft operator as an alert via the display 360 or may store the data for the dynamic memory 330 and the data storage 335. In this way, the engine status assessments (e.g., engine health report 433, engine power assurance report 437) of the EPHMS 400 may be employed to enable the aircraft operator to modify the current aircraft operations and enable maintenance personnel to anticipate maintenance requirements.

During operation of the gas turbine engine 100, the tracking/comparison module 420 adjusts the simulation parameters 414 so the MSRs 415 match the real-time performance sensor data 403.2. This optimizes the engine power model 410. The updated engine power model 410 may then be run to its limits—meaning the model can be run with maximum flight stress conditions, such as maximum flight speed etc. to determine if the engine 100 can sustain flight under those maximum conditions.

The engine performance module 405 includes a PAM experience database (PAMEDB) 463 for storage of data related to PAM types/sizes, and the effects of different types of PAM on components of the engine 100. For example, the PAMEDB 463 may be an element of the simulation parameters 414 or the particulate ingestion analysis module 460.

Data stored in the PAMEDB 463 may indicate that one type of PAM might be more likely to damage a first component X (e.g., compressors) of the engine 100 and less likely to damage a component Y (e.g., engine blades) of the engine.

Data stored in the PAMEDB 463 can be determined based on collected past historical evidence from flights of a current aircraft, and/or PAM from past and present flights of multiple aircraft. The stored data can also support the biasing of component efficiency parameters for various other components of the engine 100. The PAMEDB 463 may include known particulate levels for certain geographic or environmental regions such as cities, deserts, etc. Such data may be added to (or augment) real-time PAM sensor data 403.3 input to the engine power model 410.

In the embodiments, power assurance and/or a health state of the engine 100, is determined at least in part based on feedback loops employing sensed engine data to modify the simulation parameters 414 to reflect actual performance of an aging engine. The engine power model 410 may be continually updated over the lifetime of the engine 100. The engine power model 410 and the simulation parameters 414 may be reset to and initial state for a new engine, a nominal engine, or an average engine.

The engine power model 410 simulates engine compressors, turbines, combustion chambers and other components of the engine 100 according to thermodynamic and mechanical models expressed in the simulation techniques 412 and the simulation parameters 414. The engine power model 410 is corrected in real-time by comparing the MSRs 415 with the real-time performance sensor data 403.2.

Figure 5:
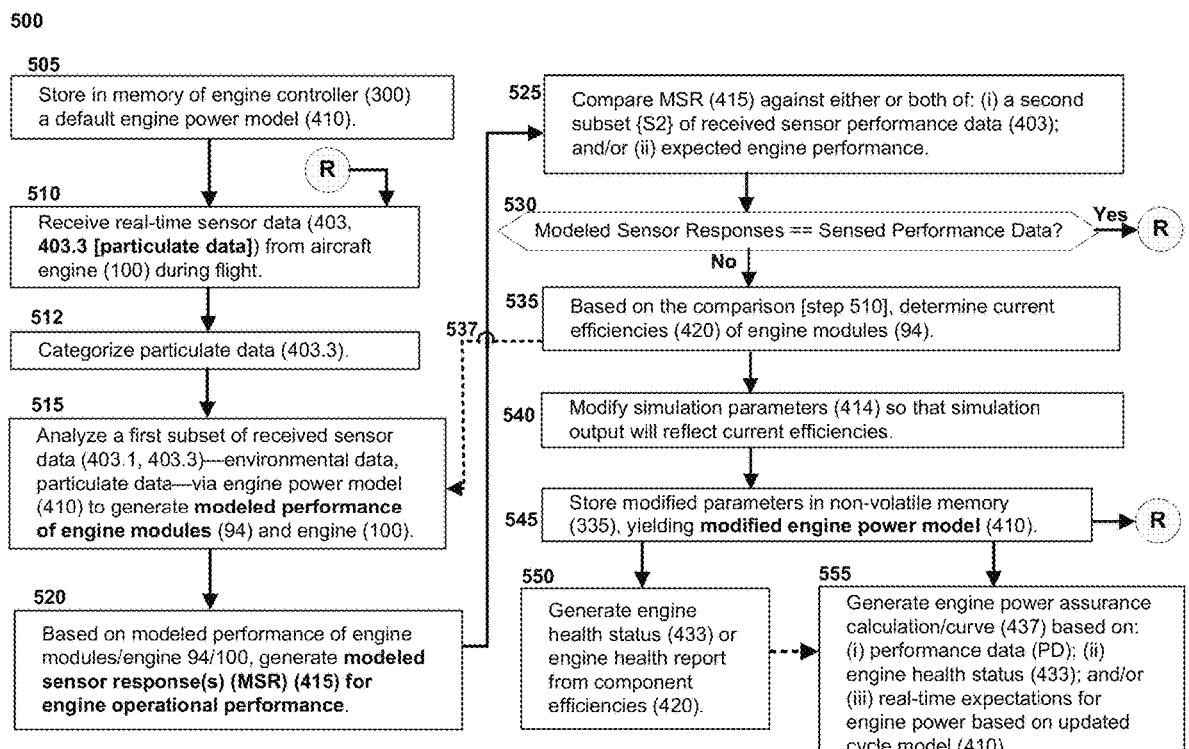
FIG. 5 presents a flow chart of an exemplary method for engine power modeling which is based at least in part on PAM data.

FIG. 5 is a flowchart of an exemplary method 500 for assessing engine power, health, and maintenance requirements based on levels and composition of the PAM 6 drawn into the gas turbine engine 100 during flight. The method may be executed by the controller 300 based on the real-time data 403 from the sensors 71, 72, and 73. The method 500 begins in block 505 where the engine power model 410 is stored in a memory of the controller 300 during a software update, power-up cycle etc., of the aircraft.

In some embodiments, the simulation techniques 412 and the simulation parameters 414 may consider an expected or default aging model for the engine 100. For example, the simulation parameters 414 can be defined as functions of time or functions of cumulative miles traversed by the aircraft. Alternatively, the simulation parameters 414 may be listed in tables where time/cumulative-miles-traveled is a parameter. Accordingly, the engine power model 410 autonomously varies over time according to expected declines in engine performance. Such aging expressions or tables may be based on a variety of sources, including historical information about similar engines.

The simulation parameters 414 may be represented in the simulation techniques 412 as variables, with specific simulation parameters 414 loaded for execution. In this way, the simulation parameters may be varied over the lifetime of the engine 100, so that the values of the variables in the simulation techniques 412 can be altered.

In block 510, during flight the controller 300 receives real-time gas path sensor data 403.1, performance sensor data 403.2, and PAM sensor data 403.3 from the sensors 71, 72, and 73, respectively. By way of example, the gas path sensor data 403.1 can include gas flow speeds/pressures, temperatures, velocity, altitude, aircraft environmental data, etc. The performance sensor data 403.2 can include turbine and engine shafts rotation speeds, etc.

In optional block 512, the method 500 may categorize types of particles flowing into and along the gas path based on real-time PAM sensor data 403.3. For example, the real-time PAM sensor data 403.3 may be categorized according to the sizes, masses, composition of detected particles, etc. The real-time PAM sensor data 403.3 may also represent an amount of the PAM 6 entering and exiting the engine 100 or its components. Thus, the method 500 determines volume or mass of particulate data trapped in the engine 100.

Memories within the controller 300 may contain stored data indicating the engine components effected, and the extent of the effect, according to categories of particles (e.g., size, composition, density, etc.). If such data has been stored, optional block 512 may determine the engine components effected (and extent) by the PAM 6 in the gas path of the engine 100.

In block 515, a subset of the received real-time data 403 is input to engine simulation techniques 412 (or engine simulation tables). In some embodiments, the real-time performance sensor data 403.2 (e.g., compressor/turbine shaft speeds etc.) may also be considered input data. Based on this input data, the simulation techniques 412 are used to generate performance of engine power model 410 for various components of the engine 100.

In block 520, the method 500 generates the MSRs 415 for engine operational performance. The MSRs 415 are values the engine power model 410 predicts as the real-time data 403 that the various sensors 71, 72, and 73 are expected to be detecting according to the simulation techniques 412 and current simulation parameters 414. In block 525, the method 500 compares the MSRs 415 against the real-time data 403 and/or expected engine component efficiencies 425.

In block 530, the method 500 determines if the MSRs 415 are equal to, or sufficiently close to the real-time gas path performance data 403.1, the performance sensor data 403.2, and the PAM sensor data 403.3. Sufficiently close matches are defined by threshold equality parameters or threshold equality ranges stored in memory associated with the tracking/comparison module 420. Such ranges are determined by experienced system engineers, engine histories, technical and legal requirements, organizational standards, and other criteria.

If the MSRs 415 and the received real-time data 403 match, the method 500 continues by looping back to block 510. If the differences between the MSRs 415 and the real-time data 403 do not match, the method 500 continues with block 535.

In block 535, the method 500 determines the current efficiency levels of the various components of the engine 100. In block 540, the method 500 modifies the simulation parameters 414 so that the MSRs 415 reflect the current, actual, real-time efficiencies determined in block 535. This results in updates to the engine power model 410.

Block 540 modifies the simulation parameters 414 based on a variety of stored expressions and translates the real-time data 403, and the component efficiencies 425, into suitable simulation parameters 414. In block 540, the determination of suitable simulation parameters 414 may be an iterative process (i.e., block 537) where block 535 loops back to block 515 to repeat operations of the simulation and comparison blocks 515, 520, 525, 530, 535, 540.

In block 545, modified simulation parameters 414 are stored and are used in the blocks 515 and 520. Following block 545, the method 500 may return to block 510, receiving sensor data, and continue with successive operations.

The method 500 may also continue with blocks 550 and 555. In block 550, the method 500 generates the engine health report 433 from the component efficiencies 425. In the block 555, the method 500 generates engine power assurance calculation(s) based on one or more of the real-time performance sensor data 403.2; the engine health report 433 and real-time expectations for the updated engine power model 410.

In the embodiments, sensors and real-time performance models may incorporate recent engine power losses into the near-term future to identify if a projected power loss due to the intake the PAM 6 is relevant to mission success (i.e., the projected power loss is extensive enough for the aircraft to lose flight power triggering the need to withdraw from the mission or modify mission operations). The method 500, upon detecting such a relevant power loss, provides suitable real-time alerts to the aircraft operator via the display 360 or other audio interfaces.

Figure 6A:
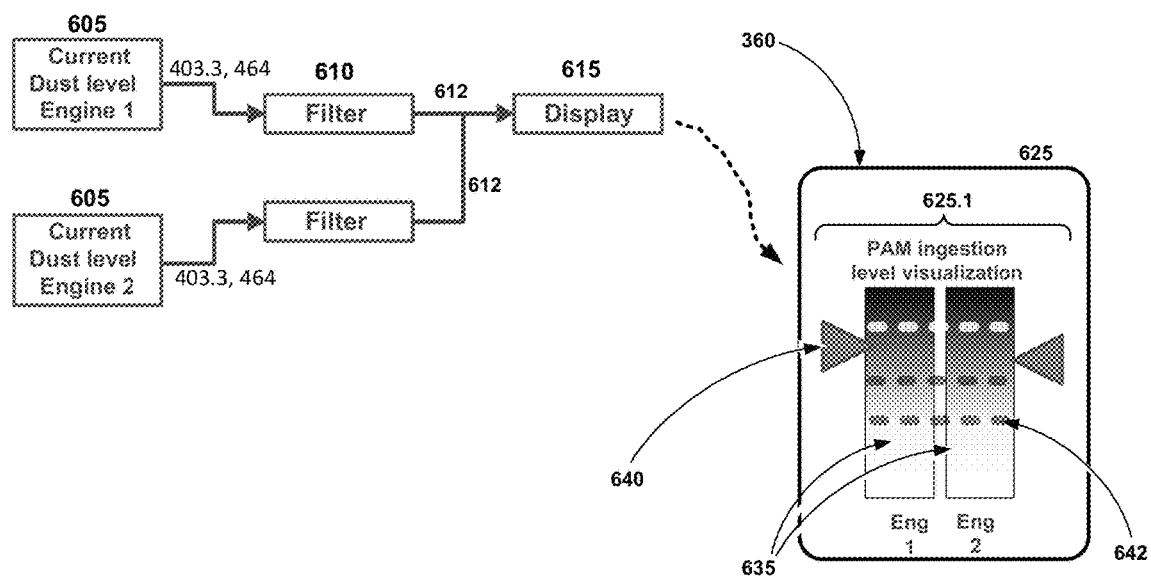
FIG. 6A presents a flow chart of an exemplary method for providing aircraft navigational support based at least in part on the detection of PAM in an aircraft engine gas flow path.

FIG. 6A is a flow chart illustration of a first exemplary method 600.1 for presenting to the aircraft operator a visualization 625.1 of detected PAM ingestion levels by the gas turbine engine 100 during flight. The method 600.1 may be performed, for example, via software executed in the engine controller 300. In block 605, the method 600.1 receives a current level of PAM intake for an engine or multiple engines of the aircraft. The current PAM level may be in the form of detailed PAM levels from the PAM sensors 73, or in the form of analyzed, detailed aggregated PAM data 464 from the PAM ingestion analysis module 460.

The method 600.1 continues with block 610, where the aggregated PAM data 464 is filtered to generate PAM data 612. The method 600.1 presents intake of the PAM 6 data pertinent to immediate, short-term mission needs. The PAM sensors 73 distinguishes incoming particles of the PAM 6 by particle size. For example, an average volume of the PAM 6 may be determined by the filter 610 to generate the PAM data 612, possibly averaged over a time period.

In another embodiment, an average density of the PAM 6 in the engine 100 may be determined by the filter 610 to generate filtered PAM data 612. The filter 610 may also apply moving averages of data, low-pass filtering (removing transient variations in PAM volume/density), and other forms of processing to yield a signal suitable for visual presentation.

In block 615, the filtered PAM data 612 is displayed to the aircraft operator via the display 360. FIG. 6A illustrates one exemplary visualization 625.1 of PAM data 612. In the visualization 625.1, the display 360 presents a current PAM ingestion level. Current PAM levels are shown separately for engines 1 and 2. For each engine, a PAM ingestion level range bar or column 635 may indicate a range of PAM from a lowest level to a highest level. For each engine, a level indicator 640 depicts a current level (e.g., measure) of PAM 6 in each engine.

For the aircraft operator, this visual information may aid in aircraft navigation. For example, a helicopter pilot may approach a destination or attempt to substantially hover in place. Via the visualization 625.1 of the PAM ingestion level display 360, the pilot may observe when the PAM intake is exceeding PAM safety threshold levels 642. The pilot may then maneuver the helicopter to a different horizontal or vertical position and check the display to determine which position(s) are observed to reduce the intake of the PAM 6.

Figure 6B:
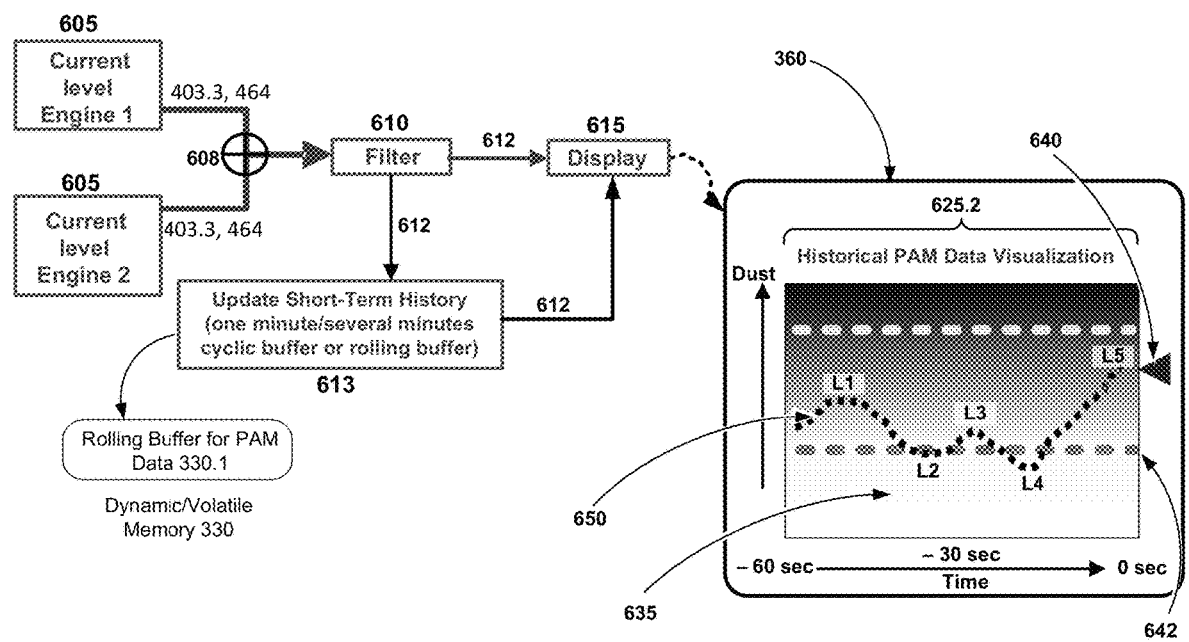
FIG. 6B presents a flow chart of an exemplary method for providing aircraft navigational support based at least in part on the detection of PAM in an aircraft engine gas flow path.

FIG. 6B is a flow chart illustration of a second exemplary method 600.2 for presenting, to the aircraft operator, a visualization 625 of detected PAM levels by an gas turbine engine 100 during flight. The visualization 625 supports a pilot in navigating the aircraft responsive to the presence of the PAM.

Method 600.2 is similar to method 600.1. In block 605, current PAM ingestion level for engine 100 acquired by the sensor 73 and analyzed by the PAM ingestion analysis module 460. In block 608, PAM levels from multiple engines are summed together, and in block 610, the summed data is filtered. The filtering (and biasing) of the real-time PAM sensor data 403.3 differs from the method 600.1 in that a degree of increased weighting may be provided to PAM data reflecting a smaller size of the PAM 6, as compared to the method 600.1.

In block 615 the current filter output 612 (e.g., PAM date) is displayed as moving tick mark (e.g., via the level indicator 640) on an edge of a historical PAM data visualization 625.2. At the same time, in block 613, a rolling buffer 330.1 (e.g., stored in dynamic memory 330) is updated with an output of the latest filtered PAM data 612. The buffer 330.1 maintains the real-time PAM sensor data 403.3 for a configurable period output of time. The most recent S seconds of data (e.g., 120 seconds), are displayed on a historical data trace plot 650 on the display 360. The historical visualization 625.2 shows the moving historical data trace plot 650 on a Y axis, against time on an X axis. A single bar or column 635 serves as the PAM vs. time background for the display.

For the aircraft operator, this time-extended visual information may further aid in aircraft navigation. By way of example, a helicopter pilot may note their helicopter positions where the PAM intake was lowest in time. If it is consistent with other mission goals and requirements, the pilot may then identify points in time, and therefore locations, where PAM intake is minimal and maneuver the helicopter accordingly.

The method 600.2 displays PAM intake as a function of recent time. The PAM data 612 can be displayed as a function of recent locations, as indicated for example by a local ground map with suitable numeric or color symbols representing different levels of PAM intake along a travel path. For example, green can be used for low levels of PAM 6, blue for higher levels, and progressively yellow, orange, and red for still higher levels of PAM intake.

Other display formats may be employed as well. For example, the historical PAM visualization 625.2 could include suitable location coordinates L1, L2, . . . , Ln at peaks or low points of the data trace plot 650. L1, L2, etc. could represent Global Positioning System (GPS) coordinates, street intersections, place names, or other indicia of specific locations.

Figure 6C:
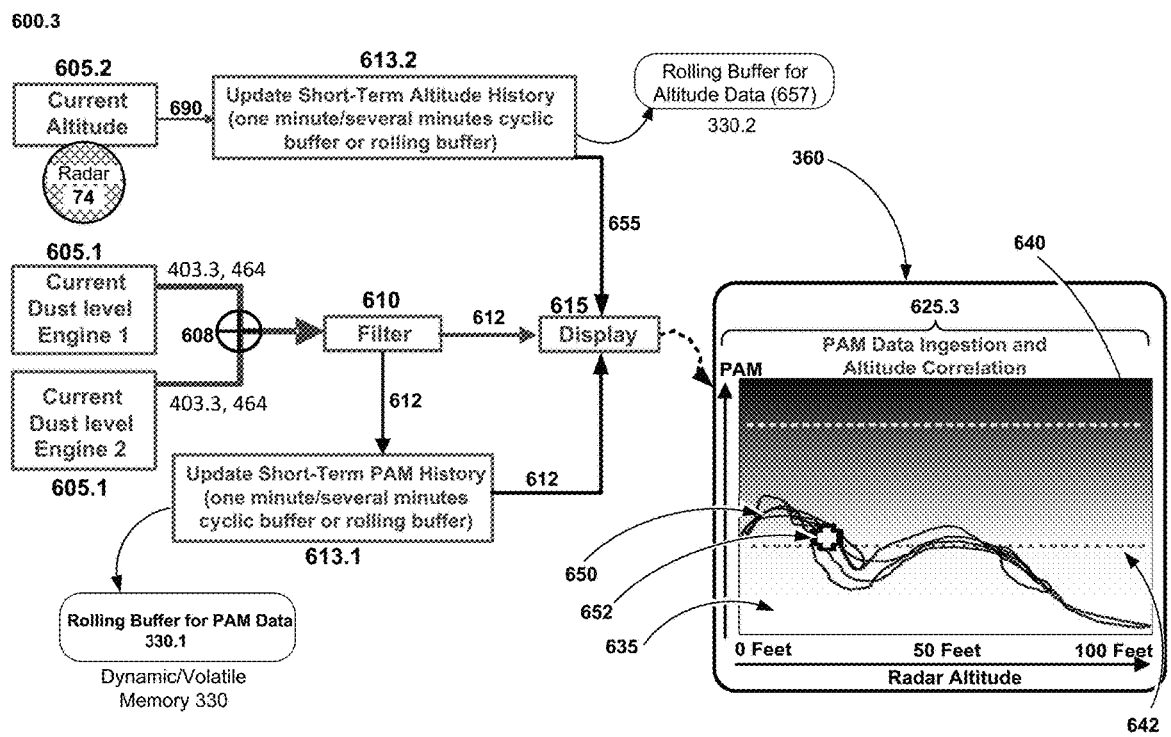
FIG. 6C presents a flow chart of an exemplary method for providing aircraft navigational support based at least in part on the detection of PAM in an aircraft engine gas flow path.

FIG. 6C is a flow chart illustration of a third exemplary method 600.3 for presenting, to the aircraft operator, a visualization 625.3 of detected PAM levels by two of the gas turbine engine 100 during flight. The method 600.3 is similar to exemplary methods 600.1 and 600.2, but with some modifications, including considering a detected relationship between the PAM intake 6 and aircraft altitude.

In the method 600.3, the current PAM ingestion level for engines 1 and 2 are acquired by the sensors 72 (block 605.1), summed (block 609), and then filtered/smoothed (block 610). A user programmable amount of time is saved in a rolling buffer such as the dynamic memory 330). In a substantially concurrent block 605.2, radar altimeter data 655 is collected from an aircraft radar altimeter. A most-recent two-minute-long history 657 of altitude data is also maintained in a rolling data buffer 330.2 (block 613.2).

In block 615, the historical PAM data 330.1 and the altitude history data 330.2/690 are displayed on visualization 625.3 which may be a PAM Data and Altitude Chart 625.3 on the display 360, with PAM ingestion historical levels on the Y axis and radar altimeter historical levels on the X axis.

By way of example, because a helicopter may hover between different altitudes within a historical time frame and because the PAM intake may vary over time at a given altitude, a scatter plot (e.g., mapping (e.g.,) 650 of PAM as correlated with altitude may yield the historical data trace plot 650. A single bar or column 635 serves as the PAM over time background for the display. Additionally, the current PAM ingestion data 652 is marked on the same display, plotted against the current radar altitude on the X axis.

For an aircraft operator, this time-extended visual information for PAM intake as correlated with altitude may help the pilot select an optimized altitude, balancing mission requirements for helicopter altitude with reduced PAM intake.

Figure 6D:
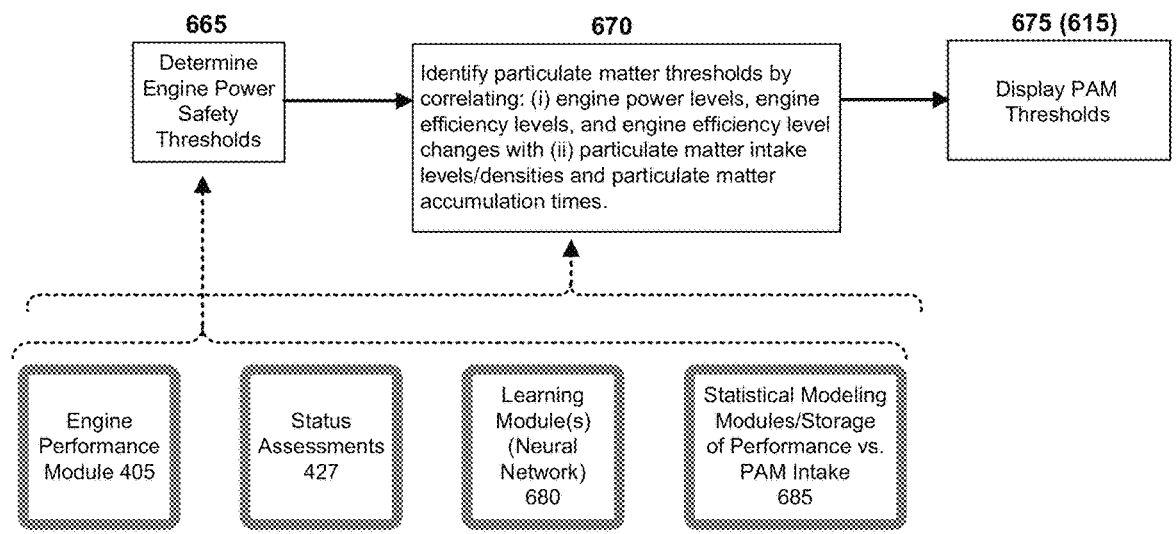
FIG. 6D presents a flow chart of an exemplary method to determine PAM safety thresholds, and also system-level representations of exemplary suitable processing modules for making such determinations.

FIG. 6D is a flow chart illustration of an exemplary method 660 to determine PAM safety threshold levels 642. Block 665 identifies suitable short-term aircraft power thresholds, which may be contingent on mission requirements (discussed in relation to FIG. 8 below). Power threshold indicates a minimum power the aircraft may need to remain in flight. Secondary thresholds may be used to determine when the aircraft may remain in flight but is at a risk level of losing flight capacity.

In block 670, the method 660 identifies one or more PAM threshold levels 642 which are associated with short-term power thresholds. Specifically, in block 670, the engine performance module 405 can identify (over time) threshold levels 642 of PAM intake which are associated with short-term power thresholds. The engine performance module 405 may be pre-configured with initial PAM intake threshold levels 642, modifiable over time as declines in engine performance occur for the aircraft.

In block 675, an appropriate PAM threshold levels 642 is presented on the particulate data visualization 625. The block 675 may be concurrent with block 615 that entails displaying real-time PAM levels for operator assessment in the aircraft's cockpit.

While the aircraft may remain in flight, and at least be capable of being landed, without engine power, a helicopter uses engine power to remain aloft and land safely. A helicopter must reach and sustains a vertical lift threshold 830 (see FIG. 8 below) to lift the helicopter. The vertical lift threshold 830 is a function of the design of the aircraft and engines. However, various power thresholds may be established by aircraft engineers, indicative of the power demands of different aircraft missions.

For example, some aircraft missions requiring transport of lower weights require less power than missions designated for maximum aircraft loads. Other types of missions, for example, under mild or moderate weather conditions will typically require less power than missions under severe storm conditions.

Figure 7:
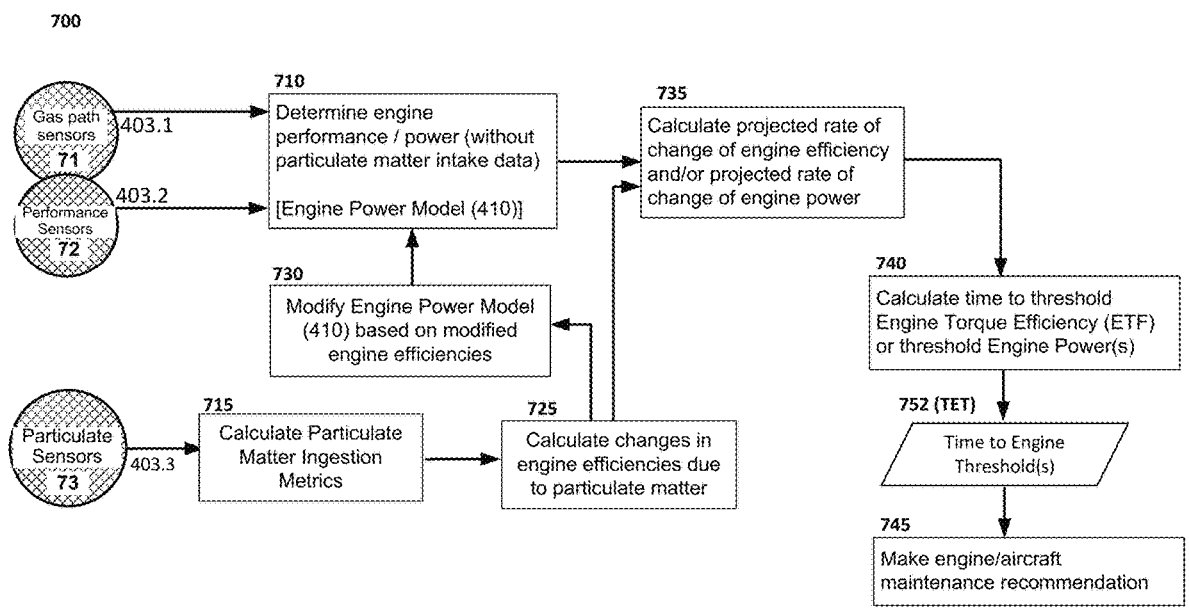
FIG. 7 presents a flow chart of an exemplary method for providing an aircraft maintenance recommendation based at least in part in the detection of PAM in an aircraft engine gas flow path.

FIG. 7 is a flowchart illustration of an exemplary method 700 for recommending engine maintenance and/or aircraft maintenance based in part on the real-time PAM sensor data 403.3 for the PAM 6 entering the gas turbine engine 100.

In block 710, the method 700 determines engine power or performance without considering PAM intake information. This may be performed, for example by the engine power model 410. At the same time, in block 715, the method 700 accepts real-time PAM sensor data 403.3 from the PAM sensors 73, and determines PAM ingestion metrics (e.g., via the PAM ingestion analysis module 460 or the tracking/ comparison module 420). In block 725, the method 700 determines changes in component efficiencies 425 due to the PAM 6.

In block 730, the engine power model 410 is modified (e.g., via the tracking/comparison module 420) based on newly determined component efficiencies 425. These engine power model changes may be accomplished in a variety of ways, as discussed above. Block 710 continues to determine engine performance and engine power as a function of the updated engine power model 410.

Based on changes in engine efficiency, block 735 determines a projected rate of change in engine efficiency and/or projected rate of change of engine power, in view of history of changes in engine power/efficiency. The resulting changes in power or efficiency due to the PAM 6 are reflected in updated projections of future engine power or efficiency.

In block 740, the method 700 determines the time expected for engine power to decline to the threshold 830 below which engine performance is unsatisfactory. This threshold efficiency determines the threshold 830 beyond which the aircraft is in need of maintenance. The outputs are based on engine threshold values 752.

In block 745, based on the threshold values 752 to vertical lift threshold 830, the method 700 makes engine/aircraft maintenance recommendations. These recommendations may take the form of suggesting future scheduling dates for maintenance. However, if the PAM 6 intake is causing rapid decline in engine power, the suggestion may take the form of an emergency alert to aircraft operator that maintenance is urgently required.

Figure 8:
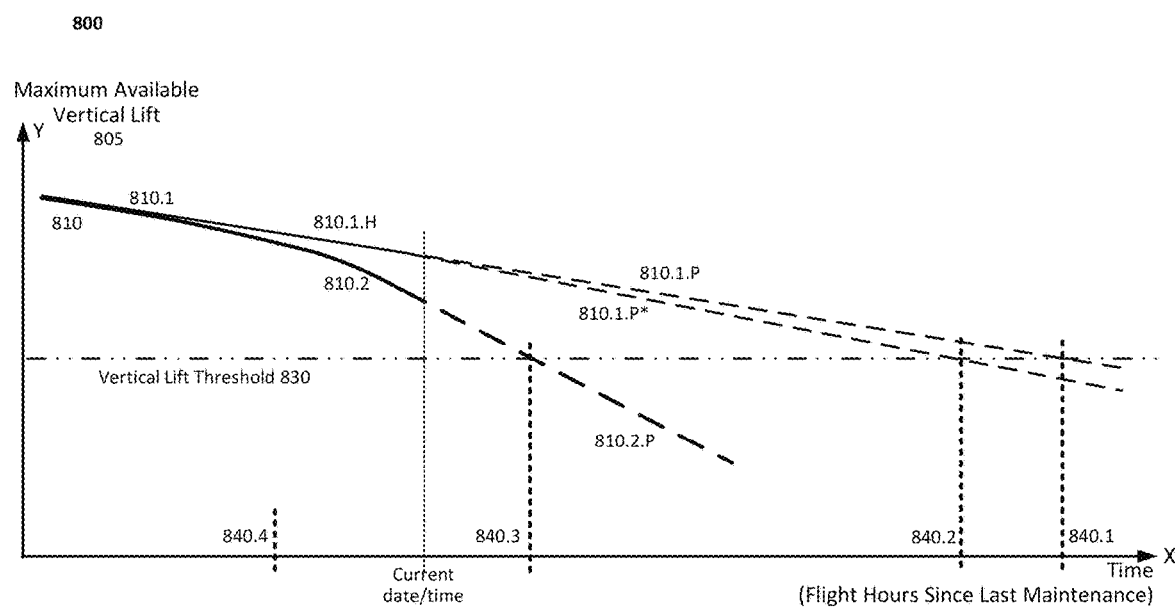
FIG. 8 presents an exemplary calculated engine maintenance plot according to the embodiments.

FIG. 8 is an exemplary illustration of calculating an engine maintenance plot 800 according to the embodiments. In the plot 800, a vertical axis indicates engine power/efficiency, that may be determined via either real-time data or by the engine power model 410. In the exemplary plot 800, the Y-axis 805 presents the maximum vertical lift the aircraft can sustain.

Exemplary plot lines 810 represent engine power, engine efficiency, maximum vertical lift or other characterizations of engine ability or power. A first plot line 810.1 represents maximum vertical lift, based on real-time engine readings or simulation and the PAM 6 intake. A first portion 810.1 (H) of the plot line 810.1, represents a historical (H) maximum vertical lift, that may gradually decrease over time.

A first extrapolated (P) portion 810.1.P of the plot line 810.1 may represent a linearly extrapolated decline in engine vertical lift over time. When the extrapolated plot line 810.1.P crosses a vertical lift threshold 830 at extrapolated future time 840.1, a recommendation for engine maintenance may occur.

An improved extrapolated plot line portion 810.1.P*, of the vertical lift plot line 810.1 may consider a more sophisticated simulation of future engine performance as a function of various measured engine performance factors and environmental data. The improved extrapolated portion 810.1.P* may result in an earlier future time 840.2 or later time (not shown) for a maintenance recommendation. In contrast to the vertical lift plot line 810.1, a second exemplary maximum vertical lift plot line 810.2 may represent a simulated calculation of engine performance as a function of intake of the PAM 6.

As a consequence, extrapolating power or efficiency into the future based on past history with PAM intake per the vertical lift plot line 810.2, will result in the extrapolated efficiency maximum available vertical lift line 810.2.P. The vertical lift plot line 810.2.P intersects the vertical lift threshold 830 at an earlier maintenance time 840.3, as compared with the times 840.2 or 840.1. This indicates maintenance should be performed much sooner than maintenance estimates that do not consider intake of the PAM 6.

However, by using the real-time PAM sensor data 403.3, the extrapolated performance vertical lift plot line 810.2.P, and the historical PAM intake for the engine, the extrapolated vertical lift plot line 810.2.P may reflect intake of PAM 6 that is not as severe as a worst-case scenario. As such, the suggested maintenance time 840.3 may allow for more time before maintenance is required, thus eliminating a need for unnecessary or premature maintenance.

The engine health report 433 and the engine health factors 434, may include raw data or summary data for PAM 6 ingestion in the course of a single flight. The engine health report 433 may include summary data for PAM 6 ingestion over multiple flights. This data may help maintenance personnel further identify an overall engine health and maintenance requirements.

The engine health report 433 may also identify PAM 6 as summarized or categorized in various ways, such as by terrains, altitudes, mission types, or atmospheric conditions that result in greater PAM accumulation. Such reporting may assist future mission planning.

The engine hardware health calculation module 430 may generate the engine health report 433 indicating the health of components modules or health of the engine 100. The engine health report 433 may indicate the component efficiencies 425 for various engine components and may indicate a maximum available engine power or may indicate a rate of decline of engine power.

The EHF 434 may also include engine torque factor, temperature, thrust, pressure, and PAM accumulations. The engine hardware health calculation module 430 may also assist with the EPHMS 400 and the exemplary method 700, thus providing recommendations for engine maintenance and recommended maintenance dates 840.

Figure 9:
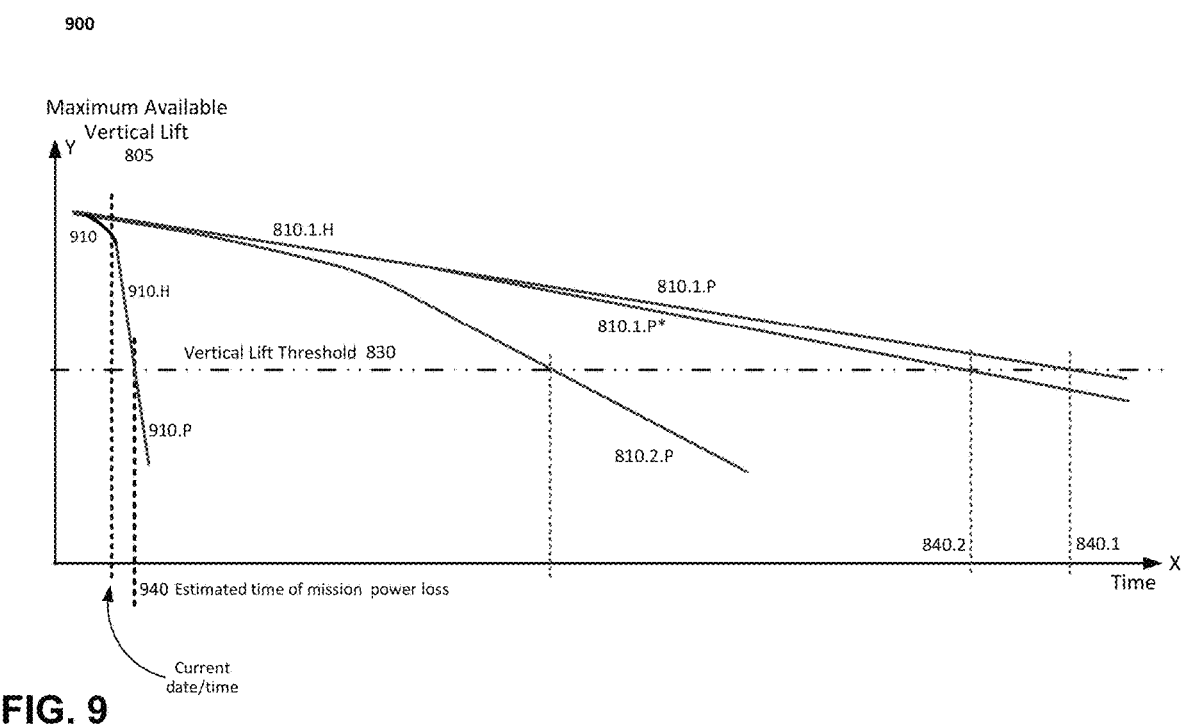
FIG. 9 presents an exemplary calculated engine maintenance plot indicating a mission need for maintenance according to the embodiments.

FIG. 9 illustrates an exemplary calculated engine maintenance plot 900. In particular, FIG. 9 illustrates an additional exemplary maximum vertical lift plot line 910 that reflects a simulated, extrapolated calculation of engine performance vertical lift plot line 910.P, generated in response to a sudden high-level intake of the PAM 6 by the engine 100. The vertical lift plot line 910 also includes a historical portion 910.H.

In one embodiment, the extrapolated vertical lift plot line 910.P is based on the expected reduction in engine power due to PAM intake. Alternatively, the extrapolated vertical lift plot line 910.P assumes that the high level of PAM intake may persist into the future. In alternative embodiments, various heuristics may be employed to estimate how much more high-level PAM intake may be expected in the near future.

The exemplary maximum vertical lift plot line 910 crosses the vertical lift threshold 830 at an estimated point in time 940 (mission power loss) relative to the present time. As a result, the embodiments may determine that the condition of the engine 100 is relevant to mission success, within the expected duration of the mission.

In the embodiments, the time implications for engine PAM intake are determined by actively modeling the operations and/or performance of the aircraft engines. This modeling may be based on mathematical models of engine elements and components, along with mathematical-physics models of engine mechanics, aircraft performance, and aerodynamic and other environmental factors.

In alternative embodiments, a processor-based learning system, including the neural networks that utilize the neural network models 680, may be trained based on historical engine data to predict declines in engine performance that are consistent with past declines due to PAM. In yet other embodiments, a processor-based statistical analysis system may identify statistical data and models correlating PAM intake levels with declines in engine performance. Such models can be extrapolated to new environmental circumstances; and then further employed to predict levels of PAM intake that may reduce engine performance in various mission contexts.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

A tangible computer-readable non-transitory storage medium stores instructions that, when executed by a hardware processor of an aircraft, causes the hardware processor to execute a method. The method includes receiving from an engine PAM sensor of an engine of the aircraft, a measure of an amount of particulate matter in a gas path of the engine during flight of the aircraft. The method also includes presenting to a pilot of the aircraft, a visualization of the measure of particulate matter, wherein the visualization supports a navigation of the aircraft responsive to a presence of particulate matter.

An exemplary system comprises a hardware processor associated with an engine of an aircraft, a particulate sensor configured to measure a level of particulate matter in the engine during flight; and a display of the aircraft. The hardware processor is configured to receive from the particulate sensor a measure of an amount of particulate matter in a gas path of the engine during the flight, and present to a pilot of the aircraft, via the display, a visualization to guide navigation of the aircraft responsive to a presence of particulate matter.

A tangible computer-readable non-transitory storage medium stores instructions that, when executed by a hardware processor of an aircraft, causes the hardware processor to execute a method. The method includes receiving from a particulate sensor of an engine of the aircraft a measure of an amount of particulate matter in a gas path of the engine; receiving from an environmental sensor of the engine an environmental state of the engine; and determining an engine efficiency based on the environmental state and the measure of the amount of particulate matter, the engine efficiency being determined according to an engine power model included in the stored instructions. The method also includes determining a current power capability of the engine based on the engine efficiency; determining a change in power capability of the engine over time based on the current power capability and a historical power capability; and determining from the change in the power capability of the engine a maintenance requirement of the engine.

A system comprises an engine controller associated with an aircraft. The engine controller comprises a hardware processor and a plurality of sensors in an engine of the aircraft. The plurality of sensors comprise (i) a particulate sensor configured to measure at least one of a measure of an amount of particulate matter in a gas path of the engine, and a measure of an amount of accumulated particulate matter in the engine; and (ii) an environmental sensor configured to detect an environmental state of the engine; and a memory configured to store an engine power model for simulating a power of the engine. The hardware processor is configured to determine an efficiency of the engine based on the engine power model and engine data from the environmental sensor; determine a change in the efficiency of the engine based on particulate data from the particulate sensor; determine a current power capability of the engine based on the engine efficiency; determine a change in the power capability of the engine over time based on current and historical power capability; and determine from the change in the power capability a maintenance requirement of the engine.

What is claimed is:

1. A tangible computer-readable, non-transitory storage medium storing instructions that, when executed by a hardware processor of an aircraft, causes the hardware processor to execute a method comprising:
   receiving, from an engine particulate sensor of an engine of the aircraft, a measure of an amount of particulate matter in a gas path of the engine during flight of the aircraft;
   presenting to a pilot of the aircraft, a visualization of the measure of the amount of particulate matter, wherein the visualization supports a navigation of the aircraft responsive to a presence of particulate matter;
   determining a power capability of the engine based an engine power model for simulating a power of the engine and data from the engine particulate sensor; and
   comparing the power capability of the engine to a power threshold to determine a time in which the aircraft may remain in flight.

2. The tangible computer-readable, non-transitory storage medium of claim 1, wherein the method further comprises:
   presenting a visual indication of a current measure of the amount of particulate matter in the gas path of the engine.

3. The tangible computer-readable, non-transitory storage medium of claim 1, wherein the method further comprises:
   presenting a visual indication of a plurality of time-successive measures of the amount of particulate matter in the gas path of the engine over a recent time interval.

4. The tangible computer-readable, non-transitory storage medium of claim 1, wherein the method further comprises:
   presenting a visual indication of a plurality of measures of the amount of particulate matter in the engine as detected at different flight altitudes.

5. The tangible computer-readable, non-transitory storage medium of claim 1, wherein the method further comprises:
   presenting a visual indication of plurality of measures of the amount of particulate matter in the engine at a plurality of different geographic ground coordinates.

6. The tangible computer-readable, non-transitory storage medium of claim 1, wherein the method further comprises:
   receiving a stream of raw particulate matter sensor data from the engine particulate sensor; and
   filtering the stream of raw particulate matter sensor data to extract a measure of a selected particulate data for display to the pilot.

7. The tangible computer-readable, non-transitory storage medium of claim 1, wherein the method further comprises:
   receiving a stream of raw particulate matter sensor data from the engine particulate sensor; and
   processing the stream of raw particulate matter sensor data to categorize the particulate matter according to one or more particulate matter properties, the one or more particulate matter properties comprising at least one of a density, mass, particle size, and composition.

8. The tangible computer-readable, non-transitory storage medium of claim 1, wherein the method further comprises:

presenting to the pilot an indication of an engine risk associated with the amount of particulate matter in the gas path.

9. A system, comprising:
a processor associated with an engine of an aircraft;
an operational sensor configured to detect an operational state of the engine;
a particulate sensor configured to measure a level of particulate matter in the engine during flight; and
a display of the aircraft; wherein:
the processor is configured to:
receive from the particulate sensor, a measure of an amount of particulate matter in a gas path of the engine during the flight;
present to a pilot of the aircraft, via the display, a visualization to guide navigation of the aircraft responsive to a presence of particulate matter;
determine an efficiency of the engine based on an engine power model for simulating a power of the engine and engine data from the operational sensor;
determine a change in the efficiency of the engine based on particulate data from the particulate sensor;
determine a current power capability of the engine based on the efficiency; and
determine a change in power capability of the engine over time based on current and historical power capability.

10. The system of claim 9, wherein the processor is further configured to present the visualization as at least one of:
a visual indication comprising the level of particulate matter in the gas path of the engine;
a visual indication comprising a plurality of time-successive measures of the level of particulate matter in the gas path of the engine over a recent time interval;
a visual indication comprising a plurality of measures of the amount of particulate matter in the engine as detected at different flight altitudes; and
a visual indication of the plurality of measures of the amount of particulate matter in the engine at a plurality of different geographic ground coordinates.

11. The system of claim 9,
wherein the processor is configured to:
determine from the change in the power capability a maintenance requirement of the engine.

12. The system of claim 11, wherein the processor is further configured to:
update an initial engine power model based upon expected performance of a new or nominal engine, the updating comprising updating the engine power model over time responsive to the measure of the amount of particulate matter; and
determine the change in the efficiency of the engine over time by determining a projected future efficiency based on a modeling of engine power according to (i) an updated engine power model, (ii) past performance data for the engine, and (iii) past engine particulate data.

13. The system of claim 11, wherein the processor is further configured to:
determine from the change in the power capability of the engine a real-time mission awareness of a loss of engine power due to intake of particulate matter.

14. A method comprising:
determining, via a processor associated with an aircraft, an engine efficiency of an engine based on an environmental state of the engine and a measure of an amount of particulate matter, the engine efficiency being determined according to an engine power model included in instructions stored in a memory of the processor;
determining, via the processor, a current power capability of the engine based on the engine efficiency;
determining, via the processor, a change in power capability of the engine over time based on the current power capability and a historical power capability; and
determining, via the processor, from the change in the power capability of the engine, an engine maintenance requirement.

15. The method of claim 14, wherein the engine power model is initially based upon expected performance of a new or nominal engine; and
wherein the engine power model is updated over time responsive to the measure of the amount of particulate matter.

16. The method of claim 15, wherein determining the change in the power capability of the engine over time comprises determining a projected future efficiency based on modeling of engine power according to (i) an updated engine power model, (ii) a past engine environmental data for the engine, and (iii) a past engine particulate data.

17. The method of claim 16, wherein determining the engine maintenance requirement from the change in the power capability of the engine over time comprises determining a future time or date when a projected future power of the engine reaches an allowed engine power threshold.

18. The method of claim 16, wherein the environmental state of the engine comprises two or more of: (i) a thrust generated by the engine; (ii) a fuel consumption of the engine; (iii) an engine torque factor; (iv) an engine pressure; and (v) an engine temperature; and
determining the projected future efficiency comprises assessing any one of the environmental states (i)-(v) in terms of another one of the environmental states (i)-(v).

19. The method of claim 15, wherein the method further comprises determining from the change in the power capability of the engine a real-time mission awareness of a loss of engine power due to particulate matter intake.

20. The method of claim 16, wherein, the environmental state of the engine comprises receiving two or more of (i) a thrust generated by the engine, (ii) a fuel consumption of the engine, (iii) an engine torque factor, (iv) an engine pressure, and (v) an engine temperature; and
determining the current power capability of the engine comprises assessing any one of environmental states (i)-(v) in terms of another one of the environmental states (i)-(v).

* * * * *

UNITED STATES PATENT AND TRADEMARK OFFICE
CERTIFICATE OF CORRECTION

PATENT NO. : 12,135,549 B2
APPLICATION NO. : 17/669331
DATED : November 5, 2024
INVENTOR(S) : Noel et al.

Page 1 of 1

It is certified that error appears in the above-identified patent and that said Letters Patent is hereby corrected as shown below:

In the Claims

In Column 20, Claim 5, Line 47, delete "of plurality" and insert -- of a plurality --, therefor.

Signed and Sealed this
Fourth Day of February, 2025

Coke Morgan Stewart
*Acting Director of the United States Patent and Trademark Office*